(No Model.)

E. BRULÉ.
VEHICLE AXLE.

No. 262,733.                    Patented Aug. 15, 1882.

WITNESSES:                                INVENTOR:
Donn Twitchell                            E. Brulé
C. Sedgwick                         BY    Munn & Co.
                                          ATTORNEYS.

N. PETERS, Photo-Lithographer, Washington, D. C.

UNITED STATES PATENT OFFICE.

EMERI BRULÉ, OF NEILLSVILLE, WISCONSIN.

VEHICLE-AXLE.

SPECIFICATION forming part of Letters Patent No. 262,733, dated August 15, 1882.

Application filed April 24, 1882. (No model.)

*To all whom it may concern:*

Be it known that I, EMERI BRULÉ, of Neillsville, in the county of Clark and State of Wisconsin, have invented a new and Improved Method of Taking up the Wear of Axle-Boxes, of which the following is a full, clear, and exact description.

Reference is to be had to the accompanying drawings, forming part of this specification, in which similar letters of reference indicate corresponding parts in all the figures.

Figure 1:
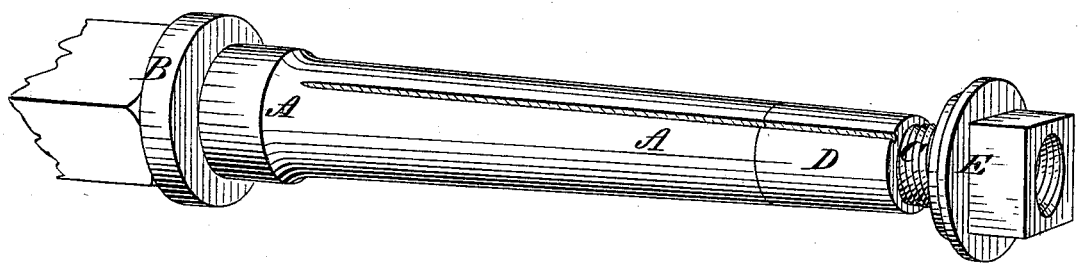
Figure 3:
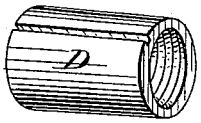
Figure 2:
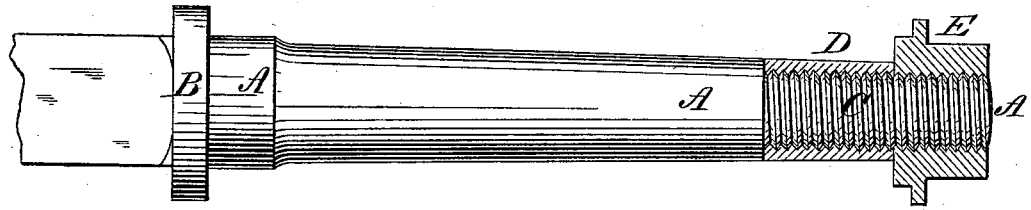

Figure 1 is a perspective view of an axle to which my improvement has been applied. Fig. 2 is a side elevation of the same, the tubular washer and nut being shown in section. Fig. 3 is a perspective view of the tubular washer.

In carrying out my invention I form on the outer end of the axle-journal a screw-threaded tenon, which is of more than twice the usual length, and apply a screw-threaded tubular washer or sleeve to said tenon, so that its outer end shall be flush with the outer end of the axle-box. The diameter and taper of this washer are the same as the portion of the journal that is cut away. When the journal and axle-box have worn so that the wheel has too much play the outer end of the washer is turned off to reduce its length corresponding to the wear, so that when again put in place its outer end will be flush with the axle-box, as before, and the wheel fit the journal as closely as required.

A represents an axle, which has a collar, B, at its inner end in the ordinary manner. The outer end of the axle A is turned down and has a screw-thread, C, formed upon the said reduced part, into which fits a screw-thread cut in the inner surface of the tubular washer D. The tubular washer D is made of such a thickness that its outer surface will be flush with the outer surface of the axle A, as shown in Figs. 1 and 2.

E is the axle-nut, which is screwed upon the end of the axle A, so as to rest against the end of the washer D when securing the wheel in place.

With this construction, when the axle and axle-box become worn so as to give the wheel too much play the nut E, the wheel, and the tubular washer D are removed and enough is cut from the outer end of the washer D to take up the wear. The washer D, the wheel, and the nut E are then replaced, and so much is cut from the outer end of the axle A as will make the said end flush with the outer end of the axle-nut E.

With this construction the wear is taken up by forcing the wheel inward upon the larger part of the axle, so that the axle-box will fit snugly upon the axle and the wheel will run true, which is not the case when the wear is taken up by placing leather washers upon the axle A at the side of the collar B, and forcing the wheel outward upon the smaller part of the axle in the ordinary manner. This latter construction, while preventing the wheel from having a longitudinal play upon the axle A, gives it more lateral play upon the said axle, so that it will not run true and will wear more rapidly than before.

If desired, the tubular washer D can be made in two or more parts, with screw-threads in their inner surfaces to fit into the screw-threads C of the axle A.

I am aware that screw-threaded sleeves or collars have been applied to the threaded tenon of an axle-journal, so as to act as jam-nuts in connection with the nut that holds the box on the journal. Said sleeves or collars are, however, made adjustable and hence an annular space is left between them and the shoulder of the journal, which results in the box wearing unequally at that point, so that a circumferential rib is formed on its inner surface.

Having thus fully described my invention, what I claim as new, and desire to secure by Letters Patent, is—

The method of taking up the wear of axle-journal boxes, which consists in removing from the journal the sleeve D and turning off the end of the same to reduce its length, then reapplying said sleeve, and screwing up the outer or flanged nut, E, as shown and described.

EMERI BRULÉ.

Witnesses:
ROBERT J. MACBRIDE,
IRA NILES.